(12) United States Patent
Woodgate et al.

(10) Patent No.: US 9,125,253 B2
(45) Date of Patent: Sep. 1, 2015

(54) ILLUMINATION SYSTEM

(71) Applicant: Optovate Limited, Oxfordshire (GB)

(72) Inventors: Graham John Woodgate, Henley-on-Thames (GB); Jonathan Harrold, Upper Heyford (GB)

(73) Assignee: OPTOVATE LIMITED, Oxfordshire (GB)

( * ) Notice: Subject to any disclaimer, the term of this patent is extended or adjusted under 35 U.S.C. 154(b) by 0 days.

(21) Appl. No.: 14/355,755

(22) PCT Filed: Nov. 5, 2012

(86) PCT No.: PCT/GB2012/000829
§ 371 (c)(1),
(2) Date: May 1, 2014

(87) PCT Pub. No.: WO2013/064801
PCT Pub. Date: May 10, 2013

(65) Prior Publication Data
US 2014/0306612 A1    Oct. 16, 2014

(30) Foreign Application Priority Data
Nov. 5, 2011 (GB) .................................. 1119112.9

(51) Int. Cl.
*H05B 37/02* (2006.01)
*H05B 33/08* (2006.01)
*F21V 23/04* (2006.01)
(Continued)

(52) U.S. Cl.
CPC ........ *H05B 37/0218* (2013.01); *F21V 23/0471* (2013.01); *H05B 33/0869* (2013.01); *H05B 37/029* (2013.01); *F21V 5/007* (2013.01); *F21V 5/045* (2013.01); *F21V 25/00* (2013.01); *F21Y 2101/02* (2013.01); *F21Y 2105/001* (2013.01); *G06K 9/00604* (2013.01)

(58) Field of Classification Search
USPC ................ 315/149–159, 185 S, 307–326, 291
See application file for complete search history.

(56) References Cited

U.S. PATENT DOCUMENTS 5,057,744 A * 10/1991 Barbier et al. .................. 315/10
6,548,967 B1 4/2003 Dowling et al.
(Continued)

FOREIGN PATENT DOCUMENTS

GB 2464102 A 4/2010
JP H0254898 A 2/1990
(Continued)

OTHER PUBLICATIONS

UKIPO, British Search Report for Application No. GB1119112.9, dated Jun. 25, 2012.
(Continued)

*Primary Examiner* — Tuyet Vo
(74) *Attorney, Agent, or Firm* — Ingrassia Fisher & Lorenz, P.C.

(57) ABSTRACT

An illumination system is provided. The illumination system comprises an array of light emitting elements, an array of directional optical elements and a light deflecting means arranged to provide a fan of light cones. A position detector senses the retroreflection from an observer's eyes and a control system reduces the intensity of light directed towards the retroreflection region. Such a system achieves glare reduction for a line-of-sight illumination apparatus.

19 Claims, 4 Drawing Sheets (51) Int. Cl.
*F21V 5/00* (2015.01)
*F21V 5/04* (2006.01)
*F21V 25/00* (2006.01)
*F21Y 101/02* (2006.01)
*F21Y 105/00* (2006.01)
*G06K 9/00* (2006.01)

(56) References Cited

U.S. PATENT DOCUMENTS

| | | | |
|---|---|---|---|
| 2001/0043163 A1 | 11/2001 | Waldern et al. | |
| 2004/0211837 A1* | 10/2004 | Eisenberg et al. | 235/462.41 |
| 2009/0086497 A1 | 4/2009 | Kamioka et al. | |
| 2011/0211110 A1 | 9/2011 | Doublet | |
| 2015/0085097 A1* | 3/2015 | Larsen | 348/78 |

FOREIGN PATENT DOCUMENTS

| | | |
|---|---|---|
| JP | 2010123373 A | 6/2010 |
| JP | 2010123534 A | 6/2010 |
| WO | 2009060423 A1 | 5/2009 |

OTHER PUBLICATIONS

ISA European Patent Office, International Search Report and Written Opinion for Application No. PCT/GB2012/000829, dated Apr. 16, 2013.

ISA European Patent Office, International Preliminary Report on Patentability for Application No. PCT/GB2012/000829, dated May 6, 2014.

* cited by examiner

ILLUMINATION SYSTEM

CROSS-REFERENCE TO RELATED APPLICATION

This application is a U.S. National-Stage entry under 35 U.S.C. §371 based on International Application No. PCT/GB2012/000829, filed Nov. 5, 2012, which was published under PCT Article 21(2) and which claims priority to British Application No. 1119112.9, filed Nov. 5, 2011, which are all incorporated herein by reference in their entirety.

TECHNICAL FIELD

The technical field relates to an illumination system, an illumination apparatus and control of illumination apparatus. Such an apparatus may be used for domestic or professional lighting, and for general illumination purposes.

BACKGROUND

To achieve high levels of illumination of a particular environment at low cost it is typically desirable to provide high brightness sources with several different mounting locations. Glare is a common problem encountered in lighting installations when the direct visibility of high brightness sources can be visually uncomfortable and may be potentially hazardous.

LED technology can achieve luminous emittance of 108 lux directly at the chip level. Such chips when viewed directly can produce excessive amounts of light for an observer looking at them. For the present description, glare is defined as the intensity of a light source that is seen by an observer from a particular viewing position when looking directly at the light source. To reduce the effect of glare, the light is typically spread over a much larger area (for example in troffers, wall washers and other light baffling arrangements); is directed into a narrow cone angle (by means of light shades or directional optics) so that high glare is only visible from a narrow range of angles; or the mounting position of light sources is typically at high level to avoid line of sight viewing of the source. The glare considerations of human vision limit the maximum source brightness that can usefully be implemented, and place constraints on the useful location of illumination apparatuses within the illuminated environment.

PCT/GB2009/002340 describes a method and apparatus to provide a high resolution collimated output from an array of small LEDs (for example 100×100 microns). Such an arrangement is capable of providing a large number of small size (for example 1 mm diameter optical output aperture) substantially collimated beams that may be individually controllable.

In addition, other objects, desirable features and characteristics will become apparent from the subsequent summary and detailed description, and the appended claims, taken in conjunction with the accompanying drawings and this background.

SUMMARY

According to an aspect of the present disclosure there is provided an illumination system, comprising: an illumination apparatus arranged to output illumination in a form comprising a plurality of light cones in different directions; a sensor arranged to detect output illumination that is reflected from one or more facial features; and control apparatus arranged to determine the light cone that the detected reflected illumination was output in; the control apparatus further arranged to vary the intensity of the illumination output in the light cone that was determined as being the light cone in which the detected reflected illumination was output. The light that is reflected may be from the retina of an eye. The control apparatus may be further arranged to vary the intensity of the illumination output in the plurality of light cones that were determined as being the light cones in which the detected reflected illumination was output. The illumination apparatus may comprise an array of light emitting elements and an array of optical elements aligned with the array of light emitting elements. The illumination apparatus may further comprise at least one light deflecting element arranged to cooperate with the array of light emitting elements and array of optical elements to provide the plurality of light cones in different directions. The optical elements may be catadioptric optical elements. The sensor may comprise an optical filter to pass light wavelengths reflected from the retina. The sensor may comprise a detector array. The output illumination for each cone may comprise a time or frequency coded signal and the control apparatus may be arranged to determine the light cone that the detected reflected illumination was output in by means of determining the detected time or frequency coded signal.

According to an aspect of the present disclosure there is provided an illumination method, comprising: outputting illumination in a form comprising a plurality of light cones in different directions; detecting output illumination that is reflected from one or more facial features; determining a light cone that the detected reflected illumination was output in; and varying the intensity of the illumination output in the light cone that was determined as being the light cone in which the detected reflected illumination was output. The light that is reflected may be from the retina of an eye. The control apparatus may be further arranged to vary the intensity of the illumination output in the plurality of light cones that were determined as being the light cones in which the detected reflected illumination was output.

Advantageously the present embodiments provide a very high brightness light source that can be positioned in the line of sight of observers, while achieving significant reduction in the amount of glare. Such an arrangement can be used to provide a wider variety of mounting positions, to reduce the cost and complexity of light baffling arrangements and to otherwise achieve a wide range of illumination geometries. This achieves a reduction of the installation cost of illumination apparatuses by enabling new mounting positions and increased maximum brightness of individual illumination apparatuses, thus reducing the total number and cost of illumination apparatuses in a particular installation.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments of the present disclosure will hereinafter be described in conjunction with the following drawing figures, wherein like numerals denote like elements, and:

FIG. 9 shows in cross section an optical structure and detector of an active glare control illumination apparatus;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
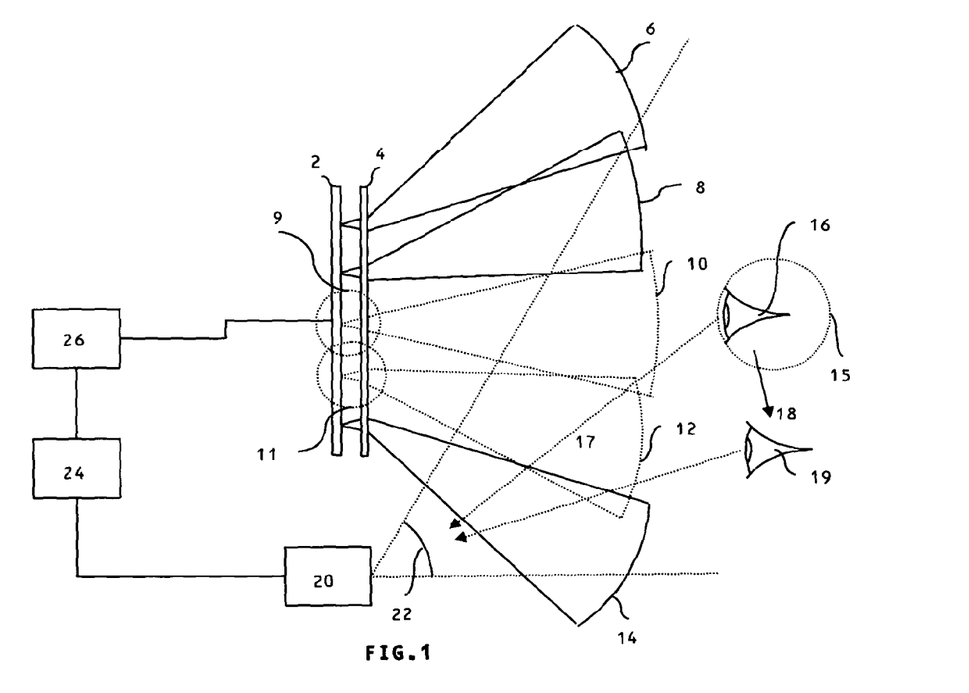
FIG. 1 shows an active glare control illumination apparatus.

FIG. 1 shows one embodiment of the present disclosure comprising a directional illumination structure 2 and an optional deflection structure 4. A fan of light cones 6, 8, 10, 12, 14 are produced by the directional illumination structure 2 and deflection structure 4 such that the angular position of the light cone varies across the area of the directional illumination structure 2 and deflection structure 4. An observer's eye with retina 15, at position 16 sees light primarily from light cone 10, with light appearing to originate from a region 9 at the centre of the illumination apparatus. Light from outside the region 9 is not substantially directed towards the observer at position 16. The light cone 10 may be defined to have an angular size such that the intensity falls to half of the maximum intensity at the edge of the cone. If the illumination apparatus is viewed from outside cone 10, the intensity in region 9 will be significantly lower than for viewing from within cone 10.

If the observer is looking towards the illumination apparatus, then some of the light from light cone 10 that reaches the observer is retroreflected from the observer's retina 15 and partly directed towards a position sensor 20, which is in close proximity to the region 9 of the directional illumination structure 2, for example at the edge of the directional illumination structure 2. The position sensor measures the illuminated light field including when present, the retroreflected light for an observer in the light field. Optical filters such as red light transmitting filters may be used to distinguish the retroreflected light from the eye against the light from the background.

A control apparatus comprises a position sensor 20, a processing unit 24 and an illumination controller 26. The processing unit 24 analyses the position sensor 20 output to provide data on the position of the retroreflections from the captured field and passes the position information to an illumination controller 26. The position sensor may be a position sensitive detector, a CCD sensor, a CMOS sensor or other known light sensitive detector capable of providing a position signal for light falling on its surface. A lens or pinhole may be arranged with the sensor to provide an angular field of view 22. More than one sensor and optic may be arranged to provide depth information on the position of retroreflections.

The processing unit 24 may for example determine the centre of mass of the retroreflected light, or may identify the location of individual retroreflected pupils that may be an angular position or a three dimensional position. The processing unit 24 may also be synchronised with signals (e.g. pulses) output from one or more of the light cones 10 in order to improve the reliability of detection. The processing unit 24 may further threshold the illuminated scene to identify pupil positions against background areas.

Image filters such as digital image filters may be used to identify the correct size of retroreflected images of observer's pupils and to distinguish from background signals.

Saccades are quick, simultaneous movements of both eyes in the same direction and can be caused by looking towards a bright light source. Saccades may cause some measurable response of the eye tracking system and can be further used to discriminate the position of eyes in the illuminated scene. Motion of the retroreflected light position may be used to distinguish the moving eyes of an observer from static background objects in the scene.

Each of the emitting cones may emit an information or coding signal contained within the light, for example a high frequency or a pulse code modulation, that is unobtrusive to the observer and that may be different for each light cone. When a retroreflected signal is detected it may be analysed, for example by frequency analysis, or by time analysis, to identify the particular emitting cone or cones responsible. In one example the emitting cones may be arranged to emit light in separate time slots which are synchronised with the detector in order to determine the particular cone producing a response to a facial feature. Advantageously this may be done without a position sensitive detector, reducing cost and complexity of optical detection.

The eye spacing of humans is nominally 65 mm, so that the distance of the observer may be determined by means of measurement of the angular separation of retroreflecting pupils and used to determine the required light intensity at the observer.

The directional illumination structure 2 may comprise an array of light emitting elements 38 and an array of directional optical elements 40 as will be described with reference to FIG. 4. The illumination controller 26 provides controllable electrical input to the array of light emitting elements 38 based on the output of the processing unit 24. Addressing of the directional illumination structure 2 is used to switch the luminous emittance of the respective elements 38 in the region 9, providing light cone 10 with a lower luminous emittance (that may be zero). Regions of light emitting elements 38 that produce light cones (for example cones 6 and 8) in which there is no retroreflected light may have normal (undimmed) luminous emittance.

If the observer looks away from the display, then no retroreflections are detected and all of the light emitting elements 38 can be switched on. If the observer moves along direction 18 to position 19 then light from a region 11 of the structures 2, 4 with light cone 12 illuminates the observer's eyes and light is retroreflected at a different angle to the sensor 20. Thus, light sources in region 9 can be fully on while light sources in region 11 can have reduced intensity.

Reducing the light intensity directed towards an observer's eyes may reduce the signal to noise ratio of detection of the eye positions. A pulsed illumination system may be arranged in cooperation with a gated detection system that is in phase with the pulsed illumination system to increase observer position measurement accuracy. Thus the integrated brightness of the illumination apparatus in the region 9 is reduced, but the brightness at the time of measurement is maintained. For example, a 100% intensity pulse of 1 ms duration can be directed towards an observer every 10 ms, and a simultaneous position detection undertaken. The total brightness of the region 10 as seen by the observer will be 10% of maximum brightness. Advantageously, the illumination apparatus may efficiently detect observer position with high signal to noise ratio. Further such pulsing can be used to reduce the effect of background noise with different illumination timings.

Advantageously, an observer looking directly at the illumination apparatus thus sees a much lower luminous intensity at the illumination apparatus surface and thus the glare is reduced. Those light sources corresponding to cones in which an observer is detected may be dimmed, rather than all the light sources. Further, although the total power output drops when a source is dimmed, this may be only in the region around the observer's face, which would otherwise block the light source. Therefore, other users of the illuminated environment (when they are not looking directly at the illumination apparatus), may experience a minimal impact of the drop in total output power. Further, the illumination apparatus can be placed in locations that are normally considered unsuitable for bright light sources, and without additional shading or beam expansion. Thus the illumination apparatus can be positioned on walls, floors or other surfaces that are potentially in the line of sight. Such installations enable the cost of the overall lighting system to be reduced. Further the cost of additional light baffling is reduced.

The intensity of illumination is reduced in the region of the light source towards which the observer is looking and is emitting light towards the observer. This is different to control systems that determine the direction of an observer's gaze and increase the light intensity in that direction of gaze.

Thus there is provided an illumination system, comprising: an illumination apparatus 2,4 arranged to output illumination in a form comprising a plurality of light cones 6, 8, 10, 12, 14 in different directions; a sensor 20 arranged to detect output illumination 17 that is reflected from one or more facial features; and control apparatus 24, 26 arranged to determine the light cone 10 that the detected reflected illumination 17 was output in; the control apparatus 24, 26 further arranged to vary the intensity of the illumination output in the light cone 10 that was determined as being the light cone in which the detected reflected illumination was output. The light that is reflected may be from the retina 15 of an eye.

Thus there is provided an illumination method, comprising: outputting illumination in a form comprising a plurality of light cones 6, 8, 10, 12, 14 in different directions; detecting output illumination that is reflected from one or more facial features; determining a light cone that the detected reflected illumination was output in; and varying the intensity of the illumination output in the light cone that was determined as being the light cone in which the detected reflected illumination was output.

Figure 2:
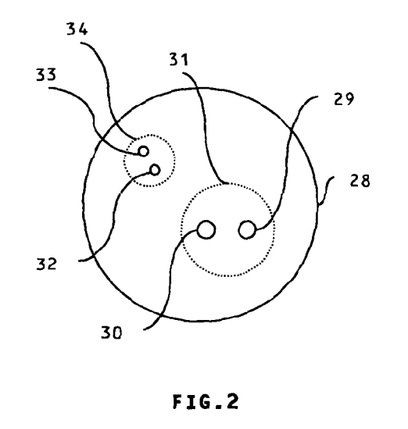
FIG. 2 shows an angular structure of the optical output of an active glare control illumination apparatus.

FIG. 2 shows a representation of the angular light output of one arrangement of the illumination apparatus of FIG. 1, for example as would be obtained if the light cones were directed onto a plane surface in the far field of the illumination structure 2. Angular region 28 is comprised of the integrated light cone angular regions corresponding to light from the individual elements 38, 40 and structure 4 across the illumination apparatus. Eye positions 29, 30 are detected by retroreflection to the sensor 20 and respective light emitting elements 38 are controlled so as to reduce the intensity in light cone angular region 31. Such an arrangement advantageously achieves active glare reduction that is dependent on the position of an observer while maintaining light output in other directions. A second observer with eye positions 32 and 33 may also look at the illumination apparatus from a different distance and orientation. The sensor and control system may then operate to reduce luminous intensity in angular region 34. If the separation between positions 32 and 33 is smaller than the separation between positions 30 and 29, it may be possible to determine that the observer is further away. In that case the region 34 may be smaller than the region 31. Further the proportion of dimming in region 34 may be smaller than the proportion of dimming in region 31. Advantageously the present embodiments can achieve glare reduction for multiple users and the amount of dimming can be relative to observer position so that the glare threshold is met while minimising reduction of total illumination apparatus output.

Figure 3:
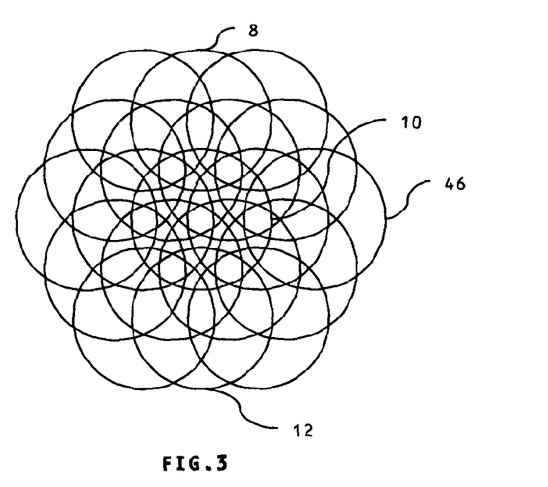
FIG. 3 shows an angular structure of the optical output of an active glare control illumination apparatus.

FIG. 3 shows an example illumination profile from an array of nineteen separate light emitting elements 38, directional optical elements 40 and deflection optical elements 44. Illumination angular regions 46 are arranged to overlap so as to provide high uniformity of the final output directional illumination structure 2. During operation regions 8, 10 and 12 are switched in synchronisation with the movement of an observer as shown in FIGS. 1 and 2.

In one embodiment, a structured light pattern can be directed towards the observer by varying the relative intensity of the respective light emitting elements, such that angular regions 46 each have a different intensity. The position of the observer within the structured patterned light field can be used to increase the accuracy of observer position detection. Further infra-red light sources can be arranged with the visible light sources for observer position measurement.

Figure 4:
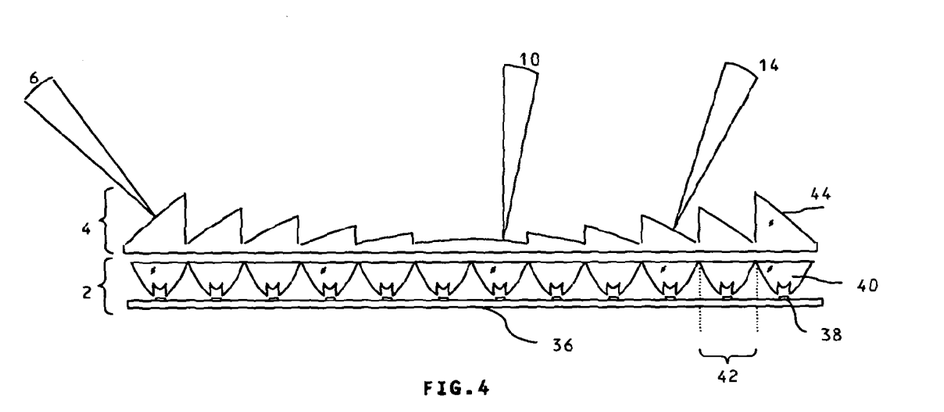
FIG. 4 shows in cross section the optical structure of an active glare control apparatus.

FIG. 4 shows a detail of one illumination apparatus. A substrate 36 with addressing circuitry is provided with an array of light emitting elements 38 such as LEDs with associated electrode connections, wavelength conversion layers and light extraction optics such as hemispherical optical elements. An array of directional optical elements 40 with output aperture 42 is provided in alignment with the array of light emitting elements so as to provide a collimated light output for each element 38. A light deflection structure 4 comprises an array of light deflecting elements 44, each arranged to deflect the light cone from the respective aligned directional optical element 40 to a respective direction. Thus across the array of light emitting elements 38 and directional optical elements 40, the angle of the output light cone is varied. The directional optical elements 40 may comprise catadioptric optical elements arranged to provide a narrow cone angle, such as 6 degrees or less (angles measured as the half cone angle for the 50% of maximum energy level). The separation of the light cones for each illuminator may be for example 3 degrees or less so as to provide high illumination uniformity in the output light field of overlapping light cones. Thus, a light source with total cone angle of +/−30 degrees may comprise an array with 20 separate illuminators 38, 40. Advantageously such an arrangement can be achieved using the method of PCT/GB2009/002340, the contents of which are incorporated herein by reference.

Thus illumination apparatus 2, 4 may comprise an array of light emitting elements 38 and an array of optical elements 40 aligned with the array of light emitting elements 38. The illumination apparatus may further comprise at least one light deflecting element 44 arranged to cooperate with the array of light emitting elements and array of optical elements to provide the plurality of light cones in different directions. The optical elements may be catadioptric optical elements.

Figure 5:
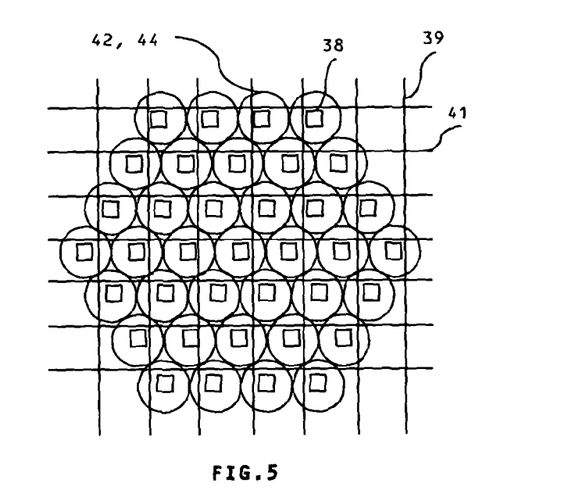
FIG. 5 shows in plan view an arrangement of light emitting and optical elements of FIG. 4.
Figure 6:
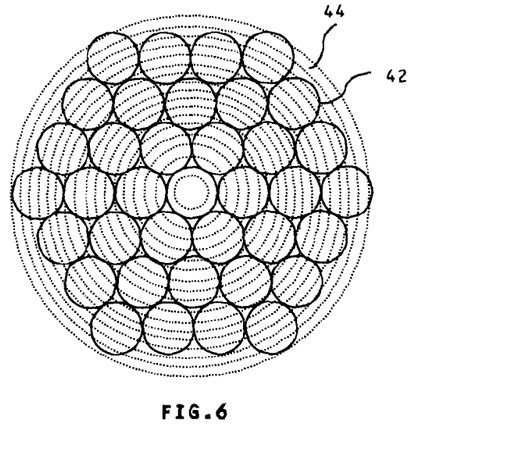
FIG. 6 shows in plan view a further arrangement of optical elements of FIG. 4.

FIG. 5 shows in plan view the arrangement of the output apertures of the directional optical elements 40 with output aperture 42 and the aperture of the light deflection element 44 which may be aligned. Electrode connections 39 and 41 are arranged to provide electrical control of elements 38. The elements 38 may be directly addressed or may be addressed by means for example of matrix addressing. The addressing may also cooperate with transistors positioned in association with each element 38. Such an arrangement advantageously provides for convenient switching of the array of light emitting elements. The light deflection element 44 may alternatively be provided by a continuous optical element such as a Fresnel lens as shown in FIG. 6 wherein deflection elements 44 are provided by continuous regions. Advantageously such an arrangement can achieve lower tolerance alignment compared to the arrangement of FIG. 5.

Figure 7A:
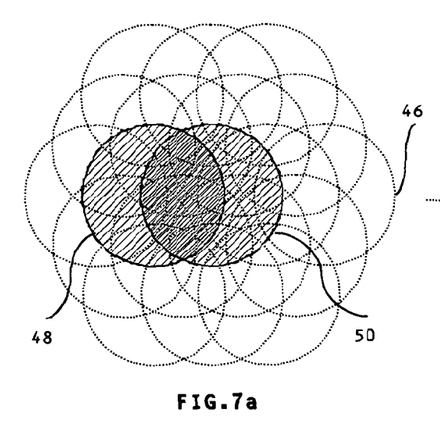
FIG. 7a shows a further angular structure of the optical output of an active glare control illumination apparatus for a first eye position.
Figure 7B:
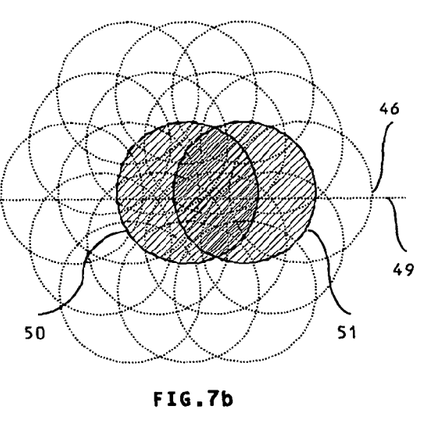
FIG. 7b shows a further angular structure of the optical output of an active glare control illumination apparatus for a second eye position.
Figure 8:
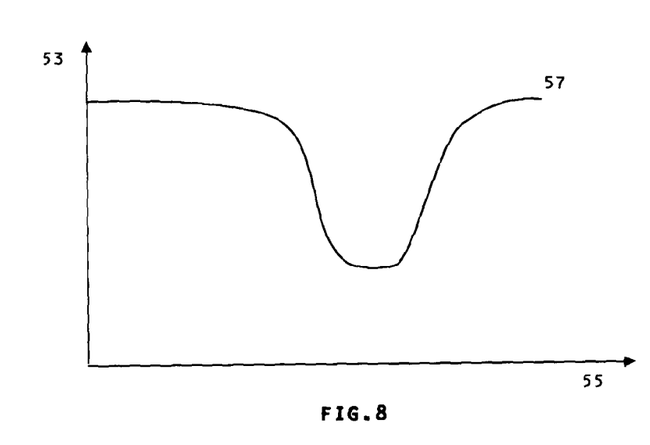
FIG. 8 shows the variation of intensity with position along the line 49 of FIG. 7b.

As shown in FIGS. 7a, 7b and 8 in the case in which light cones are overlapping, more than one light source may be switched or dimmed in the region of an observer so as to provide further reduction in perceived brightness of a source. Thus in FIG. 7a, light cones 48 and 50 are switched off by switching off the respective light emitting element 38, while in FIG. 7b for an observer having moved with respect to the output cone of the illumination apparatus, light cones 50 and 51 may be switched off. In each case, a region of reduced intensity glare 53 will be produced in the region of the observer against viewing angle 55, as shown in FIG. 8 for a line 49 through the respective profile. The light cones may be progressively dimmed and brightened in response to observer movement in order to reduce flicker effects to other observers. The sensor 20, processor 24 and control system 26 are arranged to position the retroreflection region at the minimum of the curve 57. Increasing the number of light cones that are switched off or to lower intensity can widen the region of low glare and reduce the intensity of glare.

Thus the control apparatus 24, 26 may be further arranged to vary the intensity of the illumination output in the plurality of light cones 48, 50 that were determined as being the light cones in which the detected reflected illumination was output.

FIG. 9 shows one structure of an illumination apparatus in cross section. A substrate 36 comprises an array of light emitting elements 38. A substrate 54 comprises an array of directional optical elements 40 that are aligned with the array of illumination elements to form the directional illumination structure 2. A deflection structure 4 is used to provide the fan of output light cones. A position sensor 20 comprises a pinhole 58, a filter 60 and a light spot position detector 62. Retroreflected light from observer will typically be red due to blood vessels at the observer's retina 15 and so the filter 60 may be a red transmitting filter, so as to advantageously improve the signal to noise ratio of detection. Light passing through the pinhole 58 falls onto the detector 62, the position of the light beam being measured. The detector 62 may be an area detector such as a silicon position sensitive detector, a segmented silicon detector, a photo-transistor or a photodiode array or CCD or CMOS sensor array chip. The output of the sensor may be analysed by the processor 24 to determine the likelihood of a true positive retroreflection and the centre of mass of the retroreflection. This in turn is used to provide reduction of intensity of the respective light emitting elements 38 by means of the controller 26 and the addressing circuitry used to supply the respective elements 38 on the substrate 36.

Thus the sensor 20 may comprise an optical filter 60 to pass light wavelengths reflected from the retina. The sensor 20 may comprise a detector array 62. The output illumination for each cone may comprise a time coded signal and the control apparatus may be arranged to determine the light cone that the detected reflected illumination was output in by means of determining the detected time coded signal.

Figure 10:
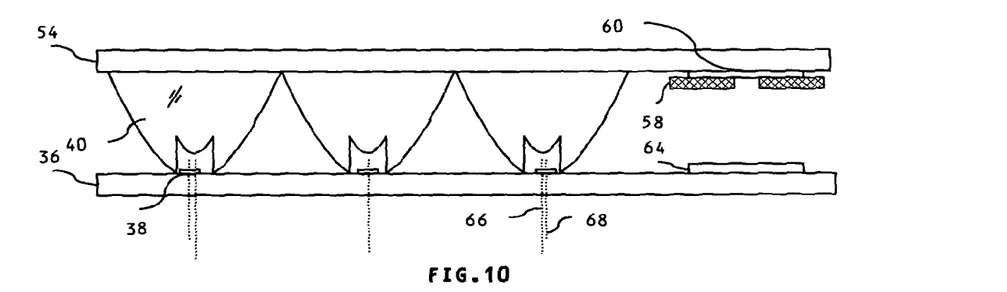
FIG. 10 shows in cross section a further optical structure and detector of an active glare control illumination apparatus.

FIG. 10 shows one embodiment wherein the optional deflection structure 4 is eliminated by offsetting the relative position of the light emitting elements 38 at the input to the aligned directional optical elements 40. Thus the centre 66 of the optical aperture is aligned with the centre 68 of the light emitting elements 38 in the centre of the illumination apparatus 2 but is offset at the edges of the apparatus. Advantageously such an arrangement may provide a lower cost by removing the deflection structure 4. FIG. 10 further shows an integrated position detection sensor 20 comprising a filter 60, pinhole 58 formed on the substrate 54 and detector 64 that may be formed on or attached to the substrate 36. Advantageously such an arrangement can provide an integrated capture function that does not require an additional alignment step, and is thinner than a separate sensor unit.

Figure 11:
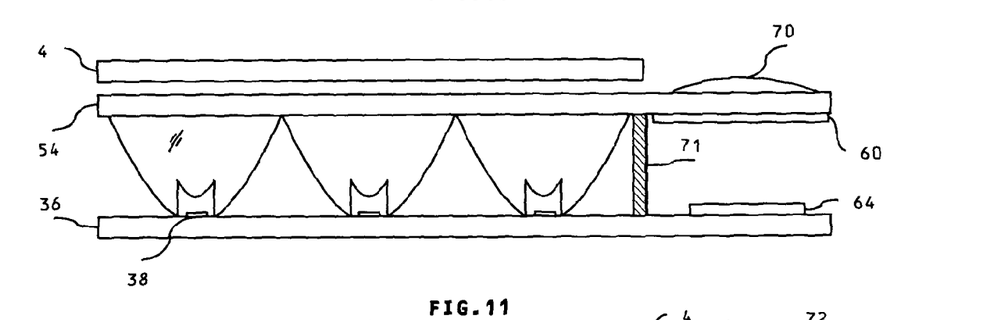
FIG. 11 shows in cross section a further optical structure and detector of an active glare control illumination apparatus.

FIG. 11 shows one embodiment wherein the pinhole 58 is replaced by a lens element 70 that may be formed on or attached to the substrate 54. A further pillar 71 may be provided to achieve improved structural stability of the structure and to provide light shielding from the light emitting elements 38, improving signal to noise ratio.

Figure 12:
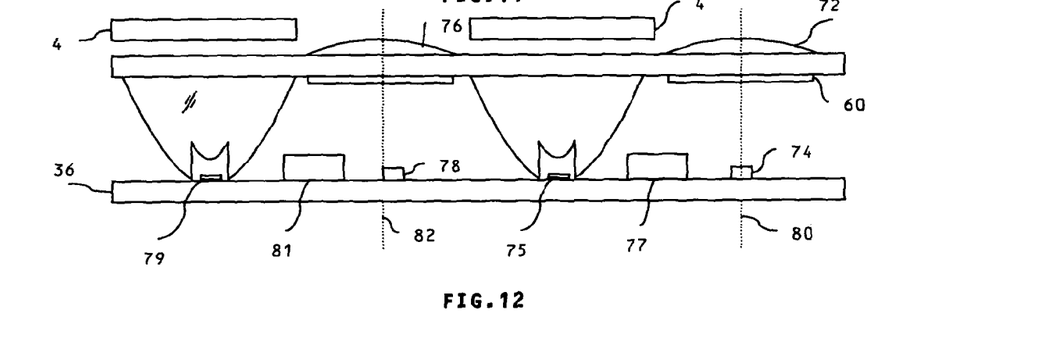
FIG. 12 shows in cross section a further optical structure and detector of an active glare control illumination apparatus.

FIG. 12 shows one embodiment wherein the sensor 64 and lens 70 is replaced by an array of light sensors 74, 78 and optics, 72, 76 with respective optical axes 80, 82. Light emitting element 75 is associated with sensor 74 and lens 72 while light emitting element 79 is associated with sensor 78 and lens 76. If retroreflected light is incident on detector 74, then a controlling circuit 77 can be used to switch illuminator 75 to a lower intensity. However, this light would not be incident on detector 78 and so the intensity of element 79 will remain unchanged. However, if the observer moves position so that retroreflected light is incident on detector 78 then controlling circuitry 81 can be used to reduce the intensity of element 79. Advantageously such an arrangement provides an integrated apparatus, reducing cost of the system.

In one embodiment, the position sensor 20 and processor 24 cooperate to determine the position of an observer's eyes using image processing of features in the observer's face rather than retroreflection from the eyes. Advantageously in such an arrangement the camera is not required to be mounted directly next to the light source, and a single camera can be used in cooperation with multiple light sources. The features that are detected may be observer eyes or may be observer face position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An illumination system, comprising:
   an illumination apparatus arranged to output illumination in a form comprising a plurality of light cones in different directions;
   a sensor configured to detect the output illumination that is reflected from one or more facial features; and
   a control apparatus configured to determine a one of the plurality of light cones that the detected reflected illumination was output from;
   the control apparatus configured to vary an intensity of the illumination output in the one of the plurality of light cones that was determined as being the light cone of the plurality of light cones in which the detected reflected illumination was output.

2. The illumination system according to claim 1 wherein the control apparatus determines that the detected reflected illumination was output from a subplurality of the plurality of light cones, and the control apparatus varies the intensity of the illumination output in the subplurality of the plurality of light cones that were determined as being the subplurality of light cones in which the detected reflected illumination was output.

3. The illumination system according to claim 1 wherein the sensor comprises a detector array.

4. The illumination system according to claim 1 wherein the output illumination for each light cone of the plurality of light cones comprises a time or frequency coded signal and the control apparatus is configured to determine the one light cone of the plurality of light cones that the detected reflected illumination was output from by determining the detected time or frequency coded signal.

5. The illumination system according to claim 1 wherein the output illumination that is reflected is from a retina of an eye.

6. The illumination system according to claim 5 wherein the sensor comprises an optical filter to pass light wavelengths reflected from the retina.

7. The illumination system according to claim 1 wherein the illumination apparatus comprises an array of light emitting elements and an array of optical elements aligned with the array of light emitting elements.

8. The illumination system according to claim 7 further comprising at least one light deflecting element arranged to cooperate with the array of light emitting elements and array of optical elements to provide the plurality of light cones in different directions.

9. The illumination system according to claim 7 wherein the optical elements are catadioptric optical elements.

10. An illumination method, comprising:
    outputting illumination in a form comprising a plurality of light cones in different directions;
    detecting output illumination that is reflected from one or more facial features;
    determining at least one light cone of the plurality of light cones that the detected reflected illumination was output from; and
    varying an intensity of the illumination output in the at least one light cone of the plurality of light cones that was determined as being the at least one light cone of the plurality of light cones in which the detected reflected illumination was output.

11. The illumination method according to claim 10 wherein the light that is reflected is from a retina of an eye.

12. The illumination method according to claim 10 wherein the at least one light cone of the plurality of light cones includes a subplurality of the plurality of light cones and the method comprises varying the intensity of the illumination output in the subplurality of the plurality of light cones that were determined as being the subplurality of the plurality of light cones in which the detected reflected illumination was output.

13. An illumination system, comprising:
    an illumination apparatus arranged to output illumination in a form comprising a plurality of light cones in different directions, the illumination apparatus including an array of light emitting elements and an array of optical elements aligned with the array of light emitting elements;
    a sensor that detects the output illumination that is reflected from one or more facial features; and
    a control apparatus that determines at least one light cone of the plurality of light cones that the detected reflected illumination was output from and the control apparatus varies an intensity of the illumination output in the at least one light cone of the plurality of light cones based on the determination of the at least one light cone.

14. The illumination system according to claim 13 wherein the control apparatus determines that the detected reflected illumination was output from a subplurality of the plurality of light cones, and the control apparatus varies the intensity of the output illumination in the subplurality of the plurality of light cones that were determined as being the subplurality of light cones that the detected reflected illumination was output from.

15. The illumination system according to claim 13 further comprising at least one light deflecting element arranged to cooperate with the array of light emitting elements and array of optical elements to provide the plurality of light cones in different directions.

16. The illumination system according to claim 13 wherein the optical elements are catadioptric optical elements.

17. The illumination system according to claim 13 wherein the sensor comprises a detector array.

18. The illumination system according to claim 13 wherein the output illumination that is reflected is from a retina of an eye.

19. The illumination system according to claim 18 wherein the sensor comprises an optical filter to pass light wavelengths reflected from the retina.

* * * * *